United States Patent [19]

Ishida et al.

[11] Patent Number: 5,395,696
[45] Date of Patent: Mar. 7, 1995

[54] MAGNETIC RECORDING MEDIUM HAVING A LUBRICANT LAYER OF A FLUOROALKYL SULFO-COMPOUND

[75] Inventors: Toshio Ishida; Hideomi Watanabe; Tsutomu Okita; Kunihiko Honda; Kazuyuki Usuki, all of Odawara, Japan

[73] Assignee: Fuji Photo Film Co., Ltd., Kanagawa, Japan

[21] Appl. No.: 44,505

[22] Filed: Apr. 9, 1993

[30] Foreign Application Priority Data

Apr. 10, 1992 [JP] Japan .................................. 4-091258
Sep. 21, 1992 [JP] Japan .................................. 4-251078

[51] Int. Cl.⁶ .............................................. G11B 5/00
[52] U.S. Cl. ................................ 428/408; 428/421; 428/457; 428/461; 428/694 TF; 428/694 TC; 428/900
[58] Field of Search .................. 428/421, 422, 694 TF, 428/694 TC, 900, 457, 461, 408

[56] References Cited

U.S. PATENT DOCUMENTS

| | | | |
|---|---|---|---|
| 4,092,110 | 5/1978 | Adolphi et al. | 21/7 |
| 4,536,444 | 8/1985 | Sumiya et al. | 428/340 |
| 4,789,599 | 12/1988 | Nakamura et al. | 428/411.1 |
| 4,828,924 | 5/1989 | Shoji et al. | 428/422 |
| 5,069,973 | 12/1991 | Saito et al. | 428/421 |
| 5,091,249 | 2/1992 | Nishikawa et al. | 428/336 |

Primary Examiner—Stevan A. Resan
Attorney, Agent, or Firm—Sughrue, Mion, Zinn, Macpeak & Seas

[57] ABSTRACT

A magnetic recording medium having a magnetic recording layer on at least one surface of a non-magnetic support, wherein the magnetic recording layer has thereon a lubricant layer containing at least one fluoroalkyl sulfo compound having an ether or ester linkage, which is represented by the following formula (1). The magnetic recording medium is free from corrosion of the magnetic recording layer and has a low coefficient of friction and excellent running durability and shelf stability. The lubricant layer is particularly suitable for a magnetic recording medium having a metal thin film with or without an inorganic protective film as a magnetic recording layer.

$$(Rf-A-R-SO_3)_kX \qquad \text{Formula (1)}$$

wherein Rf represents a fluoroalkyl group or a perfluoroalkyl group; A represents $$-O- \text{ or } -OC-;$$
$$\quad\quad\quad\quad\quad \|$$
$$\quad\quad\quad\quad\quad O$$

R represents an alkylene group; k represents an integer of 1 or 2; and X represents —H, —M, —MH (wherein M is an alkali metal or an alkali earth metal), or any one of primary to quaternary ammoniums.

6 Claims, 1 Drawing Sheet

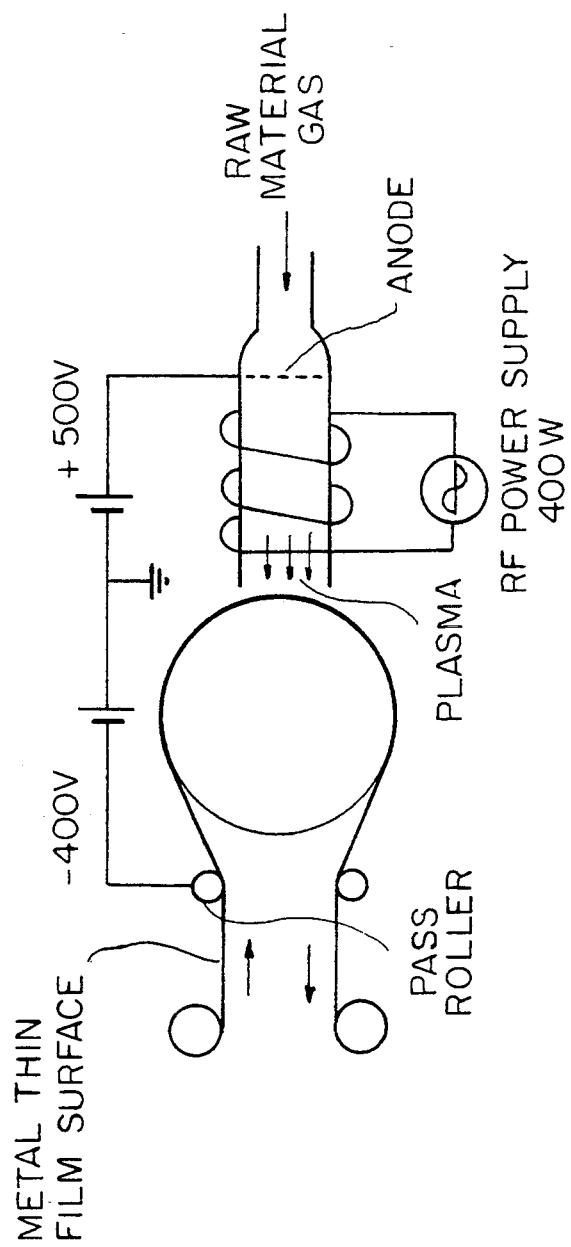

MAGNETIC RECORDING MEDIUM HAVING A LUBRICANT LAYER OF A FLUOROALKYL SULFO-COMPOUND

BACKGROUND OF THE INVENTION

The present invention relates to a magnetic recording medium having a ferromagnetic metal powder layer or a ferromagnetic metal thin film on a non-magnetic support. More particularly, the present invention relates to a magnetic recording medium which is excellent in running properties, durability and shelf stability under a wide variety of environmental conditions.

Hitherto, coating type magnetic recording mediums have widely been used. This type of magnetic recording medium is produced by coating a surface of a non-magnetic support with a dispersion of a powdered magnetic material, e.g., a ferromagnetic powder of an oxide or a metal or an alloy, in an organic binder, and then drying the coated dispersion.

With the increasing demand for higher-density magnetic recording, ferromagnetic metal thin film type magnetic recording mediums, which are produced by vapor deposition, sputtering, etc. without using a binder, have been put to practical use.

However, the ferromagnetic metal thin film type magnetic recording mediums have difficulty in ensuring the required running durability, although this type of magnetic recording medium is advantageous in smoothing the surface of the magnetic layer. Further, magnetic recording mediums are used under various environmental conditions, and the information recorded thereon are usually stored for a long period of time ranging from several years to several tens of years. Accordingly, magnetic recording mediums are demanded to have running properties, durability and shelf stability under a wide variety of environmental conditions.

To meet the demand, various methods have been proposed, e.g., a method wherein a lubricant is coated on the magnetic layer, a method wherein a non-magnetic protective film is provided on the magnetic layer, and a method wherein a non-magnetic protective layer and a lubricant layer are combined together.

The proposed methods suffer, however, from some problems as stated below.

For example, a magnetic recording medium having a lubricant layer formed of a material selected from among perfluoroalkyl polyethers and derivatives thereof (see Japanese Patent Application Laid-Open (KOKAI) Nos. 60-61918 and 61-107528, U.S. Pat. Nos. 3,778,308 and 4,897,211, Japanese Patent Application Post-Examination Publication No. 60-10368, etc.) has a high coefficient of friction occurring between the same and a sliding contact member during running at low speed, and hence this magnetic recording medium is unsatisfactory for practical use. The prior art magnetic recording medium is also unsatisfactory with regard to storage properties because it is corroded by an acidic gas, e.g., sulfite gas, resulting in peeling off of the magnetic recording layer. A magnetic recording medium having a lubricant layer formed of a material selected from among fatty acids and fatty acid esters (see Japanese Patent Application Post-Examination Publication Nos. 58-28367 and 51-39082, Japanese Patent Application Laid-Open (KOKAI) Nos. 56-80828 and 61-24017, etc.) suffers from a high coefficient of friction occurring between the same and a magnetic head during high-speed running and is not satisfactory with regard to corrosion by sulfite gas or other acidic gas. To lower the coefficient of friction between the magnetic recording medium and a magnetic head or other sliding contact member, it has been proposed to employ an organic fluorine compound as a lubricant, for example, fluorinated semi-fluorocompounds (see Japanese Patent Application Laid-Open (KOKAI) No. 63-281218), Perfluoroalkylcarboxylic acid amine salts (see Japanese Patent Application Laid-Open (KOKAI) No. 64-9961) and fluoroalkylcarboxylic acid amine salts (Japanese Patent Application Laid-Open (KOKAI) No. 03-241524). However, the magnetic recording mediums employing such lubricants are also unsatisfactory with regard to the corrosion by an acidic gas, for example, sulfite gas, and the running durability deteriorates with time.

As a method wherein a non-magnetic protective layer is provided, it has been proposed to provide an inorganic protective film of a non-magnetic material, e.g., carbon, silicon oxide, etc. (see Japanese Patent Application Laid-Open (KOKAI) Nos. 63-279426 and 59-56227). With this method, running properties and durability are improved, but it is necessary in order to obtain satisfactory improvements to increase the thickness of the protective layer. However, an increase in the thickness of the protective layer results in an increase in the distance between the magnetic recording medium and a signal recording/reproducing head, causing degradation of the electromagnetic transducing characteristics, Accordingly, further improvements are demanded. There is also a demand for further improvement in the shelf stability.

It has also been proposed to form a non-magnetic inorganic protective film together with a lubricant coating layer (see Japanese Patent Application Laid-Open (KOKAI) Nos. 61-236017, 62-219314, 01-166329 and 03-224132). This method makes it possible to improve all the properties, i.e., running properties, durability and shelf stability. However, the effectiveness largely differs depending upon the kind of material used for the lubricant layer, and the required characteristics have not yet sufficiently been obtained so far. Above all, shelf stability is still insufficient and demanded to improve.

It is an object of the present invention to provide a magnetic recording medium which is excellent running properties, durability and shelf stability, particularly in shelf stability to an acidic gas, under a variety of environmental conditions.

SUMMARY OF THE INVENTION

The present invention provides a magnetic recording medium having a magnetic recording layer on at least one surface of a non-magnetic support, wherein the magnetic recording layer has thereon a lubricant layer containing at least one fluoroalkyl sulfone compound having an ether or ester linkage, which is represented by the following formula (1).

In addition, the present invention provides a magnetic recording medium comprising a non-magnetic support, a ferromagnetic metal thin film formed on the support, a protective layer of a carbon film formed on the ferromagnetic metal thin film, and a lubricant layer formed on the protective layer, wherein the lubricant layer contains at least one fluoroalkyl sulfo compound having an ether or ester linkage, which is represented by the following formula (1).

$(Rf-A-R-SO_3)_k X$  Formula (1)

wherein Rf represents a fluoroalkyl group or a perfluoroalkyl group; A represents

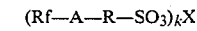

R represents an alkylene group; k represents an integer of 1 or 2; and X represents —H, —M, —MH (wherein M is an alkali metal or an alkali earth metal), or any one of primary to quaternary ammoniums.

BRIEF DESCRIPTION OF THE DRAWING

FIG. 1 illustrates an apparatus for forming a carbon film on a magnetic layer.

DESCRIPTION OF THE PREFERRED EMBODIMENT

The present invention provides a magnetic recording medium having a magnetic recording layer on at least one surface of a non-magnetic support, wherein the magnetic recording layer has thereon a lubricant layer containing at least one fluoroalkyl sulfo compound having an ether or ester linkage, which is represented by the following formula (1).

In addition, the present invention provides a magnetic recording medium comprising a non-magnetic support, a ferromagnetic metal thin film formed on the support, a protective layer of a carbon film formed on the ferromagnetic metal thin film, and a lubricant layer formed on the protective layer, wherein the lubricant layer contains at least one fluoroalkyl sulfone compound having an ether or ester linkage, which is represented by the following formula (1).

$(Rf-A-R-SO_3)_k X$  Formula (1)

wherein Rf represents a fluoroalkyl group or a perfluoroalkyl group; A represents

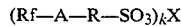

R represents an alkylene group; k represents an integer of 1 or 2; and X represents —H, —M, —MH (wherein M is an alkali metal or an alkali earth metal), or any one of primary to quaternary ammoniums.

In the compounds of formula (1), the fluoroalkyl chain of Rf may be branched. However, to fill the lubricant at a high density, a compound containing a straight-chain fluoroalkyl group or a terminal alkyl branched fluoroalkyl group is suitably used.

If the fluoroalkyl group is $R'(CF_2)_m(CH_2)_n$—(- wherein R' is $CF_2H$, $CF_3$, or $(CF_3)_2CF$), the magnetic recording medium is improved in the high-speed sliding movement on a magnetic head because the terminal fluorine extending on the surface minimizes the friction between the magnetic recording medium and the magnetic head.

Further, the total number (m+n) of carbon atoms of the fluoroalkyl group is preferably in the range of 3 to 28, more preferably 3 to 20. Of the total number of carbon atoms, the number (m) of carbon atoms of the perfluoroalkyl group is preferably in the range of 3 to 18, more preferably 6 to 12. The number (n) of carbon atoms that constitute the alkyl chain is preferably in the range of 0 to 18, more preferably 0 to 10. If the number of carbon atoms exceeds the above upper limit, the solubility of the compound in the solvent lowers, so that the solution cannot uniformly be coated on the magnetic recording layer. If the number of carbon atoms is smaller than the above lower limit, the resulting film cannot function as a protective film.

The alkylene chain of R may be branched. However, R is preferably a straight-chain alkylene group having from 2 to 20 carbon atoms, more preferably from 3 to 14 carbon atoms. If the number of carbon atoms is outside the above range, the solubility of the compound in the solvent lowers, so that it becomes difficult to coat the solution uniformly on the surface of the magnetic recording layer.

The total number of carbon atoms of Rf and R is preferably in the range of 8 to 32, more preferably 12 to 26. If the number of carbon atoms exceeds the above upper limit, the solubility of the compound in the solvent lowers, so that the solution cannot uniformly be coated on the surface of the magnetic recording layer. If the number of carbon atoms is smaller than the above lower limit, the resulting film cannot function as a protective film.

When the magnetic recording layer is formed by coating a composition containing a magnetic powder, a ferromagnetic metal or alloy powder is usable. An alloy powder having a coercive force Hc of not lower than 1,500 is particularly effective in preventing rusting caused by an acidic gas or the like.

When the magnetic recording layer in the magnetic recording medium of the present invention is a ferromagnetic metal thin film, the oxygen content in the magnetic layer is not lower than 20 at.%.

The ferromagnetic metal thin film in the present invention may be formed from a material selected from among ferromagnetic metals, e.g., iron, cobalt, nickel, etc. and ferromagnetic alloys, e.g., Fe—Co, Fe—Ni, Fe—Rh, Co—P, Co—B, Co—Y, Co—La, Co—Ce, Co—Pt, Co—Sm, Co—Mn, Co—Cr, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W, Co—Ni—Re, etc., by vapor deposition or other similar method. The thickness of the ferromagnetic metal thin film is preferably in the range of 0.02 μm to 5.0 μm, more preferably 0.05 μm to 2.0 μm.

The ferromagnetic metal thin film may further contain oxygen, nitrogen, chromium, gallium, arsenic, strontium, zirconium, niobium, molybdenum, rhodium, palladium, tin, antimony, tellurium, promethium, rhenium, osmium, iridium, gold, mercury, lead, magnesium, bismuth, etc.

A gas, e.g., oxygen, carbon dioxide, nitrogen, or ammonia, may be introduced into the magnetic film during vapor deposition so that the film contains oxygen, nitrogen, or carbon.

The carbon film that is employed as a non-magnetic protective layer may be formed by a method, for example, a plasma CVD method using hydrocarbon as a raw material, or a sputtering method using a carbon target. The carbon film may have any structure selected from among amorphous, graphite and diamond structures, and a mixture of these structures. However, it is preferable to form a rigid carbon film which is generally known as "diamond-shaped carbon" with a view to obtaining a hardness sufficient for the carbon film to function as a protective film. Diamond-shaped carbon can be formed by an ion beam method, ionized cluster beam evaporation, plasma CVD, sputtering, ion plating, photo-assisted CVD, ECR plasma CVD, etc.

Examples of non-magnetic supports usable in the present invention include plastics such as polyethylene terephthalate, polymethylene terephthalate, polyethylene-2-6-naphthalate, polyethylene isophthalate, aramid, polyimides, polyamides, polyvinyl chloride, cellulose triacetate, polycarbonates, and polyphenylene sulfide, aluminum, titanium, stainless steel, glass, etc.

It is an effective way of improving running durability to provide fine protrusions on the surface of the non-magnetic support before the formation of the ferromagnetic metal thin film because appropriate unevenness is consequently provided on the surface of the magnetic layer. The density of fine protrusions to be provided on the surface of the non-magnetic support is preferably $2 \times 10^6$ to $2 \times 10^8$ protrusions/mm$^2$, and the height of each protrusion is preferably 1 nm to 50 nm. The thickness of the non-magnetic support is generally 3 μm to 50 μm, although it depends on the use application.

To enhance the adhesion of the ferromagnetic metal thin film, an intermediate layer may be provided in between the non-magnetic support and the ferromagnetic metal thin film.

With a view to improving the running properties of the magnetic recording medium according to the present invention, it is also possible to provide a back coat layer of a coating film, which comprises principally a finely divided powder, e.g., carbon black, and a binder resin, on the surface of the non-magnetic support which is reverse to the surface thereof on which the magnetic recording layer is provided.

When the magnetic recording layer is formed by coating a composition containing a ferromagnetic metal or alloy powder and a binder, it is possible to use a thermoplastic resin, a thermosetting resin, a reactive resin, or a mixture of these resins as a binder. Specific examples of such resins include polymers and copolymers of (meth)acrylates, styrene, (meth)acrylonitrile, butadiene, vinyl ester, (meth)acrylamide, vinyl chloride, vinylidene chloride and derivatives of these substances, copolymers of the above-mentioned substances and monomers copolymerizable therewith, polyurethane resins, polyester resins, polyamide resins, epoxy resins, cellulose resins (cellulose propionate, cellulose acetate, cellulose diacetate, cellulose triacetate, nitrocellulose, etc.), phenolic resins and other condensation resins.

If a resin composition selected from among these substances contains at least one substance having a polar group, the lubricant, which is formed on the magnetic recording layer, is allowed to be stably present thereon by the interaction between the two substances.

As polar groups which are introduced into a composition used to form a magnetic recording layer, an epoxy group, $-CO_2M$, $-OH$, $-NR_2$, $-NR_3X$, $-SO_3M$, $-OSO_3M$, $-PO_3M_2$, and $-OPO_3M_2$ (wherein M is a hydrogen atom, an alkali metal, or ammonium, when one group has a plurality of M constituents, the M constituents may be the same or different; and R is an hydrogen atom or an alkyl group) are preferable from the viewpoint of dispersibility and durability of the magnetic material. The content of the polar group is preferably in the range of $10^{-7}$ to $10^{-3}$ equivalents, more preferably $10^{-6}$ to $10^{-4}$ equivalents per gram of the polymer in the composition. If the content of the polar group is lower than $10^{-7}$ equivalents, the amount of lubricant that interacts with it decreases, so that it becomes difficult to form a uniformly oriented film, resulting in a lowering in the slip characteristics. If the polar group content is higher than $10^{-3}$ equivalents, the viscosity of the binder rises, while the dispersibility lowers. Therefore, a polar group content outside the above-described range is not preferable.

Examples of thermosetting resins or reactive resins usable in the present invention include resins which are polymerized by condensation reaction or addition reaction on heating or irradiation with light or radiation, e.g., epoxy resins, polyurethane curable resins, unsaturated polyester resins, unsaturated double-bond containing resins, etc.

To improve durability furthermore, a polyisocyanate compound may be contained as a crosslinking agent.

The above-described binders may be used alone or as a mixture of two or more of them.

The binder is mixed with the ferromagnetic powder in an amount of 5 to 30 parts by weight, preferably 10 to 25 parts by weight per 100 parts by weight of the ferromagnetic powder. If the binder content is excessively low, the dispersibility and durability become inferior, whereas, if the binder content is excessively high, the filling density of the magnetic layer decreases undesirably.

In addition, the magnetic layer of the magnetic recording medium may contain various additives such as lubricant, abrasive, and antistatic agent.

Examples of lubricants usable in the present invention include silicone oil such as polysiloxane, inorganic powders such as carbon black, graphite, and molybdenum disulfide, plastics fine powders such as polyethylene and polytetrafluoroethylene, higher fatty acids, higher fatty acid ester, fluorocarbons, etc. These lubricants may be used alone or as a mixture of two or more of them. The amount of lubricant added is preferably in the range of 0.2 to 20 parts by weight per 100 parts by weight of the binder.

Examples of abrasives usable in the present invention include non-magnetic inorganic fine powders having a Mohs hardness of not lower than 5, preferably not lower than 7. Specific examples of such abrasives are fine powders of oxides such as aluminum oxides ($\alpha$-Al$_2$O$_3$, $\gamma$-Al$_2$O$_3$, fused alumina, corundum, etc.), chromium oxide (Cr$_2$O$_3$), iron oxide ($\alpha$-Fe$_2$O$_3$), silicon dioxide, titanium dioxide, etc., carbides such as silicon carbide, titanium carbide, etc., nitrides such as boron nitride (BN), etc., and diamond. The average particle diameter of these abrasives is preferably in the range of 0.05μm to 1.0 μm. The amount of lubricant added is in the range of 0.5 to 20 parts by weight par 100 parts by weight of the ferromagnetic fine powder.

Examples of antistatic agents usable in the present invention include electrically conductive powders such as carbon black (carbon black having an average particle diameter of 10 nm to 300 nm is particularly preferable), graphite, carbon black graft polymer, etc., nonionic surface active agents, anionic surface active agents, cationic surface active agents, etc.

The magnetic recording layer is formed by mixing the above-described fine powder, binder and additives with a solvent, kneading and dispersing the mixture in a dispersion mixer, and coating the resulting dispersion on the non-magnetic support. An organic solvent is preferably used. Examples of preferable organic solvents include ketones such as methyl ethyl ketone, cyclohexanone, etc., esters such as ethyl acetate, butyl acetate, etc., ethers such as Cellosolve, tetrahydrofuran, etc., aromatic hydrocarbons such as toluene, and halogenated hydrocarbons such as chloroform, etc.

Since the magnetic recording medium of the present invention has a lubricant layer containing at least one fluoroalkyl sulfo compound having an ether or ester linkage, the fluorine electron attractive group is attracted by the ether group interposed between the fluoroalkyl group and the alkyl group. Therefore, the degree of acidity does not become so high as in the case of fluoroalkylcarboxylic acid or perfluorocarboxylic acid. Accordingly, the magnetic metal will not be corroded. In addition, the molecules of the lubricant are strongly adsorbed and aligned on the surface of the protective film by the anchoring effect of the sulfonic acid, which has a polar group. Thus, the coefficient of friction lowers.

EXAMPLE

The present invention will be described below more specifically by way of examples of synthesis of lubricants used for the magnetic recording medium of the present invention and examples of production of magnetic recording mediums using the lubricants.

Synthesis Example 1

16.92 g (0.03 mol) of perfluorodecyl ethanol (n-$CF_3(CF_2)_9CH_2CH_2OH$; molecular weight: 564.12) and sodium methylate (formula: $CH_3ONa$; molecular weight: 136.14) were charged into a 100-ml three-necked flask equipped with a stirrer having a reflux condenser and a thermometer and were fused on heating to 65° C. under stirring. Then, vacuum distillation was carried out at 75° C. and under 3 mmHg to remove the ethanol, thereby obtaining $CF_3(CF_2)_7CH_2CH_2O(CH_2)_4COONa$. After 4.08 g (0.03 mol) of butane sultone ($O(CH_2)_4SO_2$; molecular weight: 136.14) was added dropwise to the above compound, 20 ml of dioxane was added thereto, and the solution was stirred. Then, recrystallization was effected with methanol. The structure of the resulting compound was determined by NMR as follows:

The purity was 98%, and the yield was 38% (Sample Nos. 2 and 7 in Table 1).

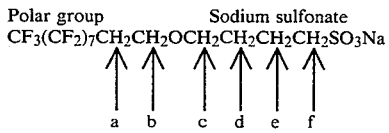

Polar group    Sodium sulfonate
$CF_3(CF_2)_7CH_2CH_2OCH_2CH_2CH_2CH_2SO_3Na$
  a    b    c   d   e   f $^1$H-NNR analysis (TMS, solvent methanol $d_4$), TMS: trimethoxysilane internal standard sample 2.48 (the 1-position (a) proton from the perfluoro group Multiplet 2H) 3.72 (the 2-position (b) proton from the perfluoro group Triplet 2H) 2.82 (the 1-position (f) proton from the carboxyl group Triplet 2H) 1.86 (the 2-position (e) proton from the carboxyl group Multiplet 2H) 1.70 (the 3-position (d) proton from the carboxyl group Multiplet 2H) 3.50 (the 4-position (c) proton from the carboxyl group Triplet 2H)

$^{19}$F-NMR analysis (δppm internal standard substance trifluorotoluene, solvent methanol $d_4$) −79.9 (the terminal Triplet 3F) −124.6 (the 2-position from the terminal Broad 2F) −122.1 (the 3-position from the terminal Broad 2F) −121.1 (the 4-position from the terminal Broad 2F) −120.3 (the 5- and 6-positions from the terminal Broad 4F) −120.1 (the 7-position from the terminal Broad 2F) −111.8 (the 8-position from the terminal Triplet 2F)

Other fluoroalkyl sulfonates were synthesized in the same way as the above except that sodium methylate was replaced with an alcoholate of another metal, or perfluoroalkyl ethanol was replaced with another fluoroalkyl alcoholate, and butane sultone was replaced with another sultone or alkyl sulfonate acid chloride.

Synthesis Example 2

0.01 mol of the compound obtained in Synthesis Example 1 was dissolved in 200 ml of methanol by using a 100-ml four-necked flask equipped with a stirrer having a reflux condenser and a thermometer, and the resulting solution was passed through a column packed with an ion exchange resin (Amberlite). The solution thus obtained was freeze-dried to obtain fluoroalkyl sulfonic acid. To identify the substance thus obtained, the molecular weight was identified by mass spectrometry, and determination was made by atomic-absorption spectrometry. The purity was 99%, and the yield was 38% (Sample Nos. 1 and 3 in Table 1).

Synthesis Example 3

0.01 mol of the compound obtained in Synthesis Example 2 was dissolved in 200 ml of methyl ethyl ketone. Ammonia or an ammonium-containing substance selected from among ammonia, secondary to quaternary ammoniums, and ammonium chloride was bubbled or dropped into the solution. After it was confirmed that the solution had become basic by pH test paper, recrystallization was effected with an organic solvent, e.g., a ketone or an alcohol. In this way, various ammonium sulfonates were obtained.

To identify each substance, the molecular weight was identified by mass spectroscopy, and the shift (1,600 to 1,700 cm$^{-1}$) of the carbonyl was investigated by IR. The purity was 80% or more, and the yield was 38% (Sample Nos. 4, 5 and 6 in Table 1). Example 1

A cobalt-nickel magnetic film (150 nm in thickness) was obliquely deposited on a polyethylene terephthalate film of 13 μm in thickness to prepare a ferromagnetic metal thin film type magnetic recording medium. An electron beam evaporation source, which was filled with a cobalt-nickel alloy (Co: 80 wt %; Ni: 20 wt %), was used as an evaporation source. With oxygen gas being introduced under a vacuum of 6.7×10$^{-3}$ Pa/m$^2$, oblique-incidence vapor deposition was carried out so that the angle of incidence was 50 degrees.

A trichlorotrifluoroethane solution of each of the lubricants shown in Table 1 was coated on the surface of the magnetic metal thin film of the resulting magnetic recording medium in the amount shown in Table 1 by using a coil bar. After drying, the magnetic recording medium was slit to prepare a sample of a video tape.

In Table 1, the oxygen content (at.%) in the surface of the magnetic layer is a value obtained by measuring a depthwise distribution of oxygen contents by argon sputtering method using AES (Auger Electron Spectroscopy) and integrating the depthwise distribution over the range from the surface to a depth of 10 nm. (Measurement of coefficient of friction)

Each sample of video tape thus obtained was wound around a stainless steel pole at a winding angle of 180° under a tension (T$_1$) of 50 g. A tension (T$_2$) required for running the sample at a speed of 3.3 cm/sec. under the above-described condition was measured. The friction coefficient μ was determined from the following formula on the basis of the measured value:

$$\mu = 1/\pi \cdot \ln(T_2/T_1)$$

The measurement of the friction coefficient was carried out after storage for 1 month at 60° C. and 70% RH under two conditions: (a) 5° C. and 10% RH, and (b) 60° C. and 90% RH. (Measurement of still durability)

Each sample tape of 50 m in length was subjected to still playback by using an 8-mm VTR (FUJIX-8, a product of Fuji Photo Film Co., Ltd.) with the still playback limiting function removed therefrom, and a time taken until the reproduced image in the pose mode disappeared was measured to evaluate the still durability. It should be noted that the test for the still durability was carried out at 5° C. and 10% RH after storage for 1 month at 60° C. and 70% RH. (Measurement of lowering in the playback output after storage)

A signal of 7 MHz was recorded on each sample of video tape obtained as described above by using a VTR (SONY TR-705, a product of Sony Corporation) and reproduced. After storage for 1 month at 60° C. and 70% RH, a lowering in the playback output was measured with the output before the storage being defined as 0 dB.

The results of these tests are shown by Sample Nos. 1 to 7 in Table 1.

Comparative Example 1

Magnetic recording mediums were produced in the same way as in Example 1 except that lubricants shown by Sample Nos. 8 to 14 in Table 1 were used, and tested in the same way as the above. The results are shown in Table 1.

terephthalate support of 10 μm in thickness by using a reverse roll so that the dry film thickness was 4.0 μm.

| Magnetic coating composition: | | |
|---|---|---|
| Ferromagnetic alloy powder (composition: Fe 94%, Zn 4%, Ni 2%; coercive force: 1,500 Oe; specific surface area: 54 mg/m$^2$) | | 100 parts |
| Vinyl chloride/vinyl acetate/maleic acid copolymer (400×110A, manufactured by Nippon Geon Co., Ltd.; degree of polymerization: 400) | (A) | 10 parts |
| Polyester polyurethane (weight-average molecular weight: 40,000; number-average molecular weight: 25,000; kinds and amounts of polar group are shown in Table 2) | (B) | 8 parts |
| Coronate L (manufactured by Nippon Polyurethane Industry Co., Ltd.) | | 4 parts |
| Abrasive (α-alumina; average particle size: 0.2 μm | | 1.5 parts |
| Carbon black (average particle size: 40 nm) | | 1 part |
| Methyl ethyl ketone | | 300 parts |

While the magnetic coating material was undried, the coated non-magnetic support was subjected to magnetic field orientation by using a magnetic of 3,000 gauss and dried. Thereafter, each of the lubricants shown in Table 2 was coated on the magnetic layer in the amount shown in Table 2 by using a coil bar with trichlorotrifluoroethane used as a solvent and dried. Thereafter, the resulting magnetic recording medium was supercalendered and then slit into a tape of 8 mm in width, thus preparing an 8-mm video tape as a sample.

Each magnetic recording medium thus obtained was measured for the coefficient of friction and still durability, and after storage, a lowering in the playback output was measured, in the same way as in Example 1. Fur-

TABLE 1

| Sample | Lubricant | Oxygen content in mag. layer (at. %) | Coating weight (mg/m$^2$) | Output Lowering (dB) | Still (min) | Friction coefficient (μ) cond. (a) | cond. |
|---|---|---|---|---|---|---|---|
| 1 | $CF_3(CF_2)_2CH_2CH_2O(CH_2)_3SO_3H$ | 20 | 20 | 1 | 94 | 0.25 | 0.25 |
| 2 | $CF_3(CF_2)_7CH_2CH_2OCO(CH_2)_4SO_3Na$ | 20 | 30 | 3 | 93 | 0.25 | 0.26 |
| 3 | $CF_3(CF_2)_{10}CH_2CH_2O(CH_2)_4SO_3H$ | 20 | 20 | 1 | 98 | 0.23 | 0.23 |
| 4 | $H(CF_2)_8CH_2CH_2O(CH_2)_4SO_3NH_4$ | 10 | 20 | 3 | 78 | 0.3 | 0.31 |
| 5 | $CF_3(CF_2)_7(CH_2)_6OCO(CH_2)_4SO_3N(CH_3)_4$ | 20 | 10 | 2 | 89 | 0.25 | 0.25 |
| 6 | $(CF_3)_2CF(CF_2)_6CH_2CH_2O(CH_2)_3SO_3NH(CH_2CH_3)_2$ | 20 | 20 | 2 | 117 | 0.26 | 0.26 |
| 7 | $(CF_3(CF_2)_7(CH_2)_{44}OCO(CH_2)_3SO_3)_2Ca$ | 20 | 20 | 3 | 91 | 0.27 | 0.27 |
| 8 | Stearic acia | 20 | 20 | 5 | 2 | 0.31 | 0.34 |
| 9 | Butyl stearate | 20 | 20 | No output | 2 | ≧0.6 | ≧0.6 |
| 10 | No lubricant | 20 | — | No output | 0 | ≧0.6 | ≧0.6 |
| 11 | FOMBLIN Z-DEAL | 20 | 20 | 9 | 33 | 0.53 | ≧0.6 |
| 12 | $CF_3(CF_2)_7CH_2COO^\ominus HN^\oplus HC_{16}H_{33}$ | 20 | 20 | 7 | 59 | 0.39 | 0.41 |
| 13 | $CF_3(CF_2)_7(CH_2)_{10}COOH$ | 20 | 20 | 5 | 48 | 0.31 | 0.33 |
| 14 | $CF_3(CF_2)_7COOH$ | 20 | 20 | 11 | 23 | 0.58 | ≧0.6 |

Sample No. 11 FOMBLIN Z-DEAL: $CH_3COOCCF_2O(C_2F_4O)_m(CF_2O)_nCF_2COOCH_3$ (produced by Montefluos)

Example 2

The following composition was kneaded for 48 hours to disperse the components by using a kneader and a ball mill. Thereafter, 5 parts of a polyisocyanate was added thereto. The mixture was further kneaded for 1 hour to disperse the polyisocyanate, and filtered through a filter having an average pore size of 1 μm to prepare a magnetic coating material. The resulting coating material was coated on the surface of a polyethylene ther, weatherability was evaluated by the following method. The results of these tests are shown in Table 2. (Evaluation of weatherability)

Each sample was stored in the following gas, and the surface of the magnetic layer after the storage was visually observed.

Chlorine: 10 ppb
Nitrogen dioxide: 200 ppb
Hydrogen sulfide: 10 ppb

Flow rate of the mixture of the three gases: 1,000 l./h.
Temperature and relative humidity: 30° C. and 70% RH
Storage time: 10 days
Evaluation criteria:
○ . . . There was no considerable change in the luster of the magnetic layer surface during the storage.
Δ . . . There was a considerable lowering in the luster of the magnetic layer surface during the storage.
× . . . The magnetic layer surface was dull.

Comparative Example 2

Magnetic recording mediums were produced in the same way as in Example 2 except that lubricants shown by Sample Nos. 21 to 25 in Table 2 were used, and tested in the same way as the above. The results are shown in Table 2.

methane used as a raw material, as shown in FIG. 1. As the RF power, 400 W was applied to produce a plasma. The plasma was accelerated by applying −400 V to the magnetic layer surface through a pass roller and further applying a bias DC voltage of +500 V to an anode installed in the gas inlet, thereby forming a carbon film on the surface of the magnetic layer.

Each of the lubricant layers shown in Table 3 was provided on the magnetic recording medium thus obtained using Freon 113 as a solvent. Further, the magnetic recording medium was provided with a back coat layer and then slit into a tape of 8 mm in width, thus preparing a magnetic recording tape as a sample.

The properties of the magnetic tape thus obtained were evaluated by the same methods as in Examples 1 and 2.

Comparative Example 3

Magnetic recording mediums were produced in the same way as in Example 3 except that lubricants shown

TABLE 2

| | Constitueunt elements | | | | Effects | | | |
|---|---|---|---|---|---|---|---|---|
| | Binder (B) | | | | | Output | | Friction |
| | | Polar | | Coating | | Lower- | | coefficient |
| Sample | Polar group | group cont. | Lubricant | weight (mg/m²) | Rust | ing (dB) | Still (min) | cond. (a) | cond. (b) |
| 15 | OPO$_3$Na$_2$ | 1 × 10$^{-5}$ | CF$_3$(CF$_2$)$_2$CH$_2$CH$_2$O(CH$_2$)$_3$SO$_3$H | 20 | ○ | 0 | 150 | 0.20 | 0.20 |
| 16 | SO$_3$Na | 1 × 10$^{-5}$ | CF$_3$(CF$_2$)$_7$CH$_2$CH$_2$OCO(CH$_2$)$_4$SO$_3$Na | 30 | ○ | 1 | 146 | 0.21 | 0.22 |
| 17 | OSO$_3$Na | 1 × 10$^{-5}$ | CF$_3$(CF$_2$)$_{10}$CH$_2$CH$_2$O(CH$_2$)$_4$SO$_3$H | 20 | ○ | 0 | 148 | 0.19 | 0.19 |
| 18 | SO$_3$Na | 1 × 10$^{-5}$ | H(CF$_2$)$_8$CH$_2$CH$_2$O(CH$_2$)$_4$SO$_3$NH$_4$ | 20 | ○ | 2 | 101 | 0.25 | 0.26 |
| 19 | SO$_3$Na | 1 × 10$^{-5}$ | CF$_3$(CF$_2$)$_7$(CH$_2$)$_6$OCO(CH$_2$)$_4$SO$_3$N(CH$_3$)$_4$ | 10 | ○ | 2 | 136 | 0.20 | 0.21 |
| 20 | PO$_3$Na$_2$ | 1 × 10$^{-5}$ | (CF$_3$)$_2$CF(CF$_2$)$_6$CH$_2$CH$_2$O(CH$_2$)$_3$SO$_3$NH(CH$_2$CH$_3$)$_2$ | 20 | ○ | 1 | 153 | 0.21 | 0.22 |
| 21 | SO$_3$Na | 1 × 10$^{-5}$ | Stearic acid | 20 | Δ | 3 | 1 | 0.30 | 0.31 |
| 22 | SO$_3$Na | 1 × 10$^{-5}$ | Butyl stearate | 20 | Δ | No output | 95 | 0.58 | ≧0.6 |
| 23 | SO$_3$Na | 1 × 10$^{-5}$ | CF$_3$(CF$_2$)$_7$CH$_2$COOH | 20 | Δ | 5 | 42 | 0.40 | 0. |
| 24 | SO$_3$Na | 1 × 10$^{-5}$ | FOMBLIN Z-DEAL | 20 | Δ | 6 | 68 | 8 | 0.40 |
| 25 | SO$_3$Na | 1 × 10$^{-5}$ | CF$_3$(CF$_2$)$_7$CH$_2$OCOC$_{16}$H$_{33}$NH$_3$ | 20 | Δ | 3 | 85 | 0.29 | 0.31 |
| 26 | SO$_3$Na | 1 × 10$^{-5}$ | CF$_3$(CF$_2$)$_7$(CF2),OCOOH | 20 | Δ | 3 | 70 | 0.28 | 0.30 |

Example 3

A cobalt-nickel alloy (Ni 20 wt%) was deposited on a polyethylene terephthalate film of 7 μm, 300 mm and 5,000 m in thickness, width and length, respectively, by oblique-incidence vapor deposition to form a ferromagnetic metal thin film layer of 200 nm in thickness. The oxygen content in the surface of the ferromagnetic thin film was 20 at.%. Then, a carbon film of 8 nm in thickness was formed on the metal thin film by an RF plasma CVD method in which a DC bias was applied with by Sample Nos. 34 to 40 in Table 3 were used, and tested in the same way as the above. The results are shown in Table 3.

TABLE 3

| | | | Effects | | | |
|---|---|---|---|---|---|---|
| | | Coating | Output | | Friction | |
| | | weight | Lowering | Still | coeffecient (μ) | |
| Sample | Lubricant | (mg/m²) | (dB) | (min) | cond. (a) | cond. (b) |
| 27 | CF$_3$(CF$_2$)$_2$CH$_2$CH$_2$O(CH$_2$)$_3$SO$_3$H | 20 | 0 | 200 | 0.24 | 0.24 |
| 28 | CF$_3$(CF$_2$)$_7$CH$_2$CH$_2$OCO(CH$_2$)$_4$SO$_3$Na | 30 | 0 | 170 | 0.25 | 0.26 |
| 29 | CF$_3$(CF$_2$)$_{10}$CH$_2$CH$_2$O(CH$_2$)$_4$SO$_3$H | 20 | 0 | 155 | 0.21 | 0.25 |
| 30 | H(CF$_2$)$_8$CH$_2$CH$_2$O(CH$_2$)$_4$SO$_3$NH$_4$ | 20 | 2 | 121 | 0.28 | 0.30 |
| 31 | CF$_3$(CF$_2$)$_7$(CH$_2$)$_6$OCO(CH$_2$)$_4$SO$_3$N(CH$_3$)$_4$ | 10 | 1 | 155 | 0.26 | 0.26 |
| 32 | (CF$_3$)$_2$CF(CF$_2$)$_6$CH$_2$CH$_2$O(CH$_2$)$_3$SO$_3$NH(CH$_2$CH$_3$)$_2$ | 20 | 0 | 170 | 0.26 | 0.26 |
| 33 | (CF$_3$(CF$_2$)$_7$(CH$_2$)$_4$$_4$OCO(CH$_2$)$_3$SO$_3$)$_2$Ca | 20 | 2 | 160 | 0.26 | 0.27 |
| 34 | Stearic acid | 20 | 4 | 15 | 0.32 | 0.35 |
| 35 | Butyl stearate | 20 | 6 | 10 | 0.57 | 0.60 |
| 36 | No lubricant | — | 6 | 2 | 0.60 | 0.60 |
| 37 | FOMBLIN Z-DEAL | 20 | 0.38 | 52 | 0.50 | 0.59 |
| 38 | CF$_3$(CF$_2$)$_7$CH$_2$COO$^{\ominus}$HN$^{\oplus}$HC$_{16}$H$_{33}$ | 20 | 7 | 98 | 0.39 | 0.40 |
| 39 | CF$_3$(CF$_2$)$_7$(CH$_2$)$_{10}$COOH | 20 | 3 | 88 | 0.32 | 0.34 |
| 40 | CF$_3$(CF$_2$)$_7$COOH | 20 | 9 | 48 | 0.59 | 0.60 |

Thus, in the magnetic recording medium of the present invention, the fluorine electron attractive group is attracted by the ether or ester group interposed between the fluoroalkyl group and the alkyl group. Therefore, the degree of acidity does not become so high as in the case of fluoroalkylcarboxylic acid or perfluorocarboxylic acid. Accordingly, there are no problems such as those associated with the prior art, that is, corrosion of the metal constituting the magnetic recording layer, and dehydrochlorination of vinyl chloride used as a binder material. In addition, the molecules of the lubricant are strongly adsorbed and aligned on the surface of the protective film by the anchoring effect of the sulfonic acid, which has a polar group. Thus, the coefficient of friction lowers. The lubricant layer according to the present invention is particularly effective in improving the running durability and shelf stability of a magnetic recording medium comprising a ferromagnetic metal thin film with or without an inorganic protective film formed thereon.

What we claim is:

1. A magnetic recording medium comprising:
a non-magnetic support, a ferromagnetic metal thin film, and a lubricant layer further from the support than the ferromagnetic metal thin film, said lubricant layer comprising at least one fluoroalkyl sulfo compound having an ether or ester linkage, which is represented by the following formula:

$(Rf\text{—}A\text{—}R\text{—}SO_3)_k X$ wherein Rf represents the following formula:

$R'(CF_2)_m(CH_2)_n\text{—}$ wherein R' represents $CF_2H$, $CF_3$ or $(CF_3)_2CF$;
m represents an integer of 3 to 18;
n represents an integer of 1 to 18;
m+n represents an integer of 4 to 28;

A represents

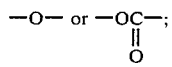

R represents an alkylene group wherein the number of carbon atoms is in the range of from 3 to 14 and the total number of carbon atoms of Rf and R is in the range of from 8 to 32;
k represents an integer of 1 or 2; and X represents —H, —M, —MH (wherein M is an alkali metal or an alkali earth metal), or any one of primary to quaternary ammoniums.

2. A magnetic recording medium according to claim 1, wherein Rf has $CF_3$ at a terminal thereof, and R is a straight-chain alkylene group.

3. A magnetic recording medium according to claim 1, wherein the total number of carbon atoms of Rf and R is in the range of from 12 to 26.

4. A magnetic recording medium according to claim 3, further comprising a protective film of carbon between said ferromagnetic metal thin film and said lubricant layer.

5. A magnetic recording medium according to claim 2, wherein the total number of carbon atoms of Rf and R is in the range of from 12 to 26.

6. A magnetic recording medium according to claim 5, further comprising a protective film of carbon between said ferromagnetic metal thin film and said lubricant layer.

* * * * *